INVENTORS
B. CARR
C. P. WILSON, JR.
F. G. CIAPETTA
BY Joseph P. Nigon
ATTORNEY

United States Patent Office 3,404,097
Patented Oct. 1, 1968

3,404,097
METHOD FOR PREPARING SILICA-MAGNESIA-FLUORIDE CATALYST
Charles P. Wilson, Jr., and Brownell Carr, Cincinnati, Ohio, and Frank G. Ciapetta, Silver Spring, Md., assignors to W. R. Grace & Co., New York, N.Y., a corporation of Connecticut
Filed Aug. 16, 1965, Ser. No. 479,710
10 Claims. (Cl. 252—441)

ABSTRACT OF THE DISCLOSURE

A method for preparing a silica-magnesia-fluoride cracking catalyst wherein a carbon dioxide precipitated silica-magnesia-fluoride composite is sprayed dried and subsequently aged for a period of from 1 to 4 hours at a temperature of about 160° F. to 180° F. prior to washing and final drying. It is found that the silica-magnesia-fluoride catalyst prepared by the present method processes an extremely high degree of attrition resistance and activity.

---

Figure 1:
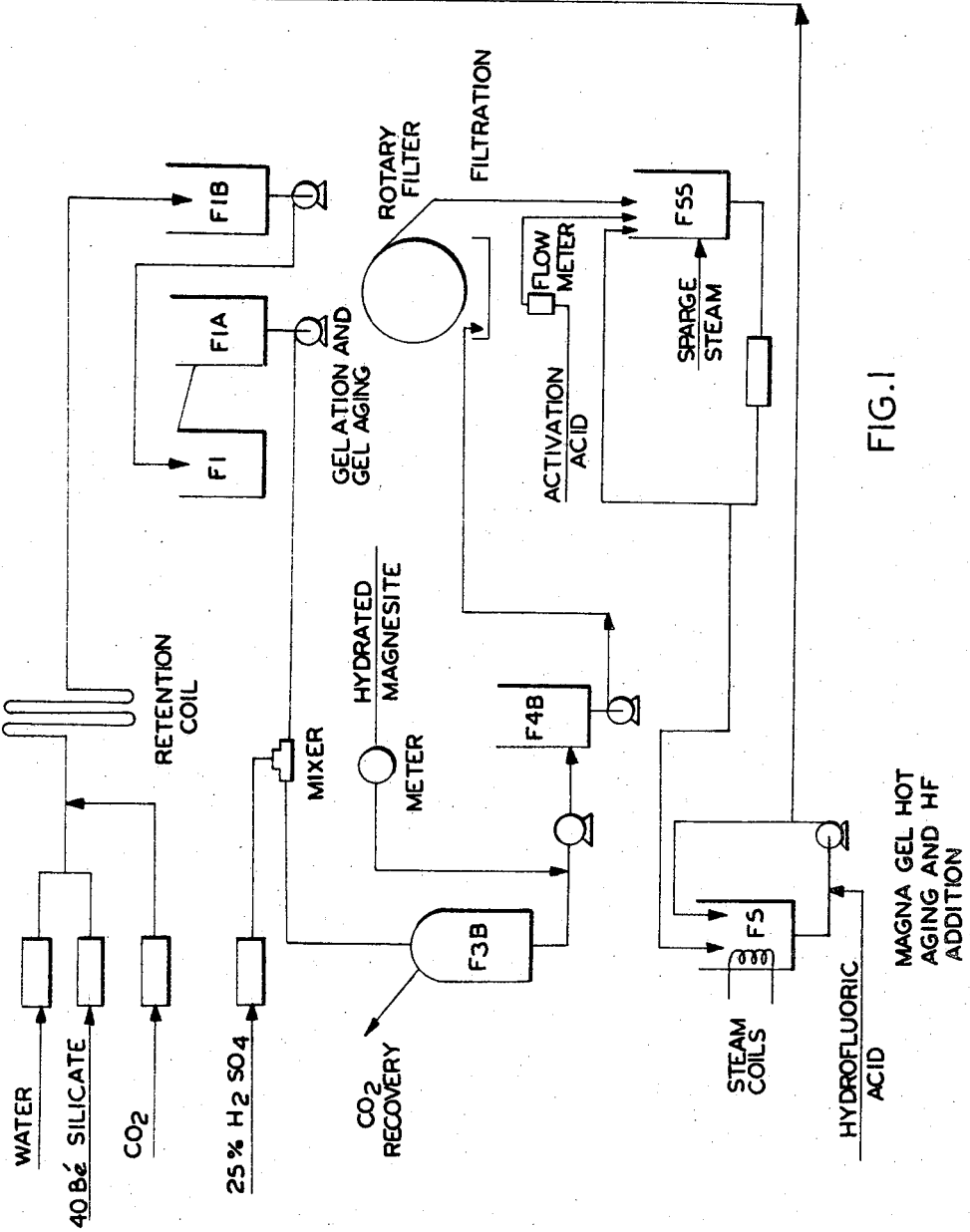
Figure 2:
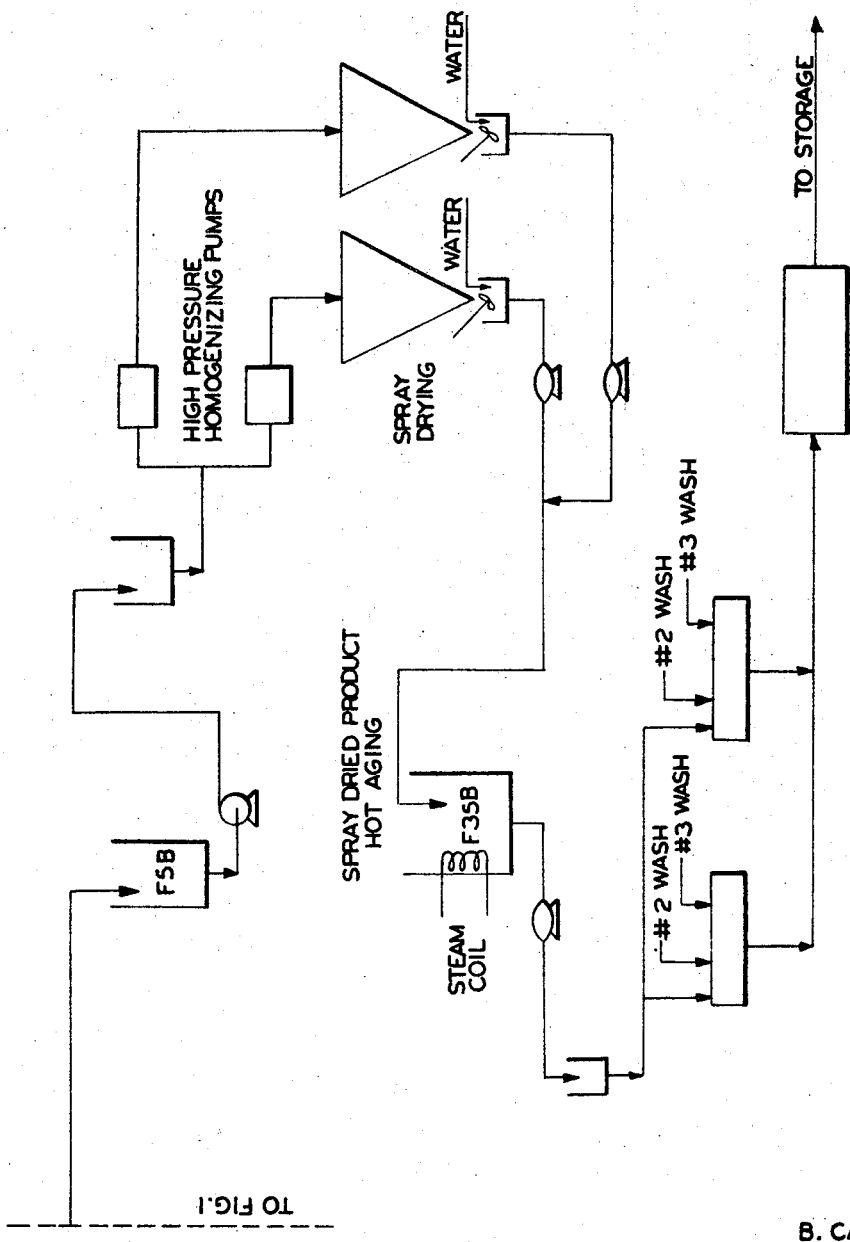
Figure 3:
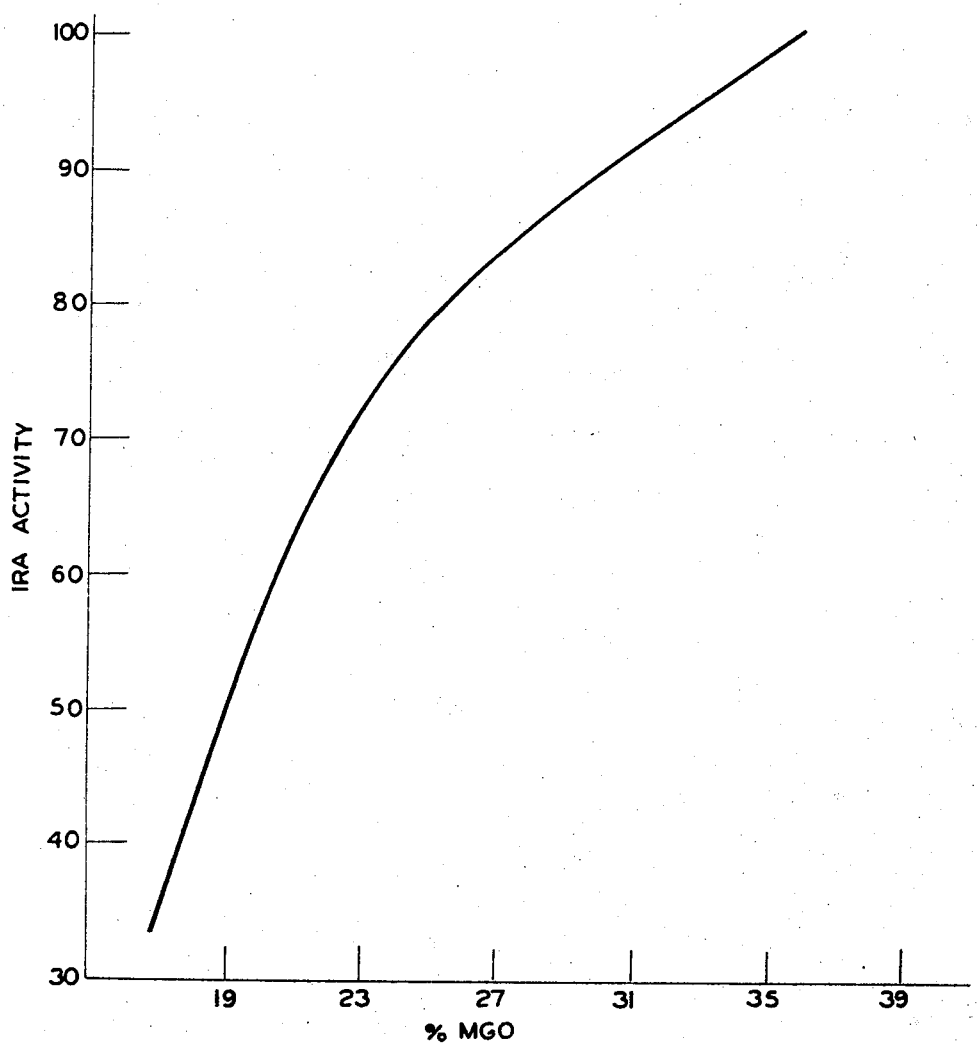

This invention relates to a catalyst suitable for hydrocarbon conversion reactions. In one specific embodiment, it relates to a novel improved silica-magnesia catalyst and its method of manufacture.

The prior art is replete with methods for preparing suitable catalyst for use in petroleum cracking operations. It has been known for some time that synthetic porous solids comprising silica and a metal oxide could be contacted with mineral or petroleum oil, at elevated temperatures to produce lower boiling fractions of hydrocarbons. The suitability of such synthetic catalyst depends on both the metal oxide selected and the method of combining the metal oxide with silica. It has been found that catalysts prepared from silica and magnesia have desirable cracking properties. The methods of preparing these catalysts varies widely, depending on the emphasis placed on the type of property, such as attrition resistance, activity, etc., desired in the final product.

The effectiveness of any particular catalyst is, of course, measured by its performance during the cracking operation. To be a desirable catalyst, the catalyst must be resistant to attrition, have good equilibrium activity and high steam and thermal activity. A catalyst with these propetries is readily reactivated by calcination to remove carbon deposited on the surfaces of the catalyst during the cracking operation. One of the principle problems in preparing silica-magnesia catalyst has been to prepare a catalyst that has good activity as well as good thermal stability. Thermal stability is, of course, important because of the high temperatures frequently reached in the regeneration cycle of the catalytic cracking operation.

The prepartion of silica-magnesia catalysts involves formation of complex silicon-oxygen-magnesium structural combinations that are not fully understood from a theoretical standpoint. This is evidenced by the fact that although the methods of preparing these catalysts have several points of similarity, the resulting products are frequently surprisingly dissimilar.

U.S. Patent 2,901,440 describes a process for preparing a silica-magnesia cracking catalyst, wherein fluoride is added as a component of the catalyst. The purpose of adding fluoride is to improve the reactivation properties of the catalyst. The preparation of the catalyst according to the method described in this patent, has resulted in a catalyst having good activity and improved thermal stability properties. This catalyst is prepared using sulfuric acid to gel the silica, and form a silica gel from the sodium silicate.

The use of carbon dioxide to gel the silica in the preparation of silica-alumina cracking catalyst has been known for sometime. However, the application of the carbon dioxide gelation technique to the preparation of silica-magnesia cracking catalyst requires very careful control in several steps of the process. We have discovered a novel process for utilizing carbon dioxide gelation in a process for making a silica-magnesia catalyst that has very high cracking activity, and is thermally stable.

The initial step in the preparation of our novel catalyst consists in preparing a silica gel. The silica gel may be prepared by gelling an alkali metal silicate solution, such as sodium silicate, with gaseous carbon dioxide. Sodium silicate, having a silica to soda ratio of about 3.3 to 1, diluted to a $SiO_2$ content of about 4 to 10% by weight is quite suitable. Silica gel formation occurs when sodium silicate is contacted with gaseous carbon dioxide. After the silica gel has been formed, it is heated to a temperature of about 80° to 130° F., then aged for periods of ½ to 2 hours.

We have found it desirable to neutralize the sodium silicate in two stages. In the first stage, the sodium silicate is contacted with sufficient carbon dioxide to neutralize 50 to 100% of the $Na_2O$ of the silicate. This forms a hydrogel in which the remaining unneutralized sodium silicate is supported. After a short time, the pH of the gel is lowered to a pH of about 2.0 to 5.0, preferably about 2.5 with a strong mineral acid, such as sulfuric acid. We have found that heating and aging the silica gel at low pH assures the complete evolution of the carbon dioxide.

The starting materials in the preparation of our colloidal dispersion of hydrated magnesia are not limited. Magnesia suitable for use in this invention may be obtained from many sources, e.g., magnasite, dolomite or magnesium salts derived from sea water. Because of the fact that the combining properties of the magnesia depend on the origin (natural or synthetic) physical and chemical composition of the raw material, and the physical state and degree of purity of the calcined magnesia, we prefer to use calcined magnesium oxide, hydrated magnesium oxide, precipitated magnesium hydroxide or a colloidal dispersion of magnesium sulfate and magnesia which form a magnesium oxysulfate salt.

The preferred source of magnesia in the preparation of our catalyst is hydrated light burned calcined magnesia having a surface area of about 40 m.²/g.

The results of prior art investigations emphasize the need of a large pore volume and a large pore diameter to obtain good regeneration characteristics. We have found that the pore size of the silica gel is dependent on its preparation before the addition of the magnesia. It is also helpful to control the pore size of the magnesia within the colloidal dispersion. It is generally known that high temperature aging during the preparation of the silica gel increases the pore size of the gel. We have found that very desirable pore structure can be obtained by controlling the temperature from at about 80° F. to 120° F. during the gelation of the silicate by carbon dioxide. This control of pore diameter and pore volume of the silica is of primary importance since this affects the pore volume of the final product.

In the next step of the process, two alternate procedures are available. Alternate procedure A is described in Examples I and II. Alternate procedure B is described in Examples III, IV, and V.

In procedure A, the magnesia components and the silica gel are mixed to form a gelatinous mass. The mass is filtered to remove excess water and increase the solids content of the mass. This is because the rate of reaction between the magnesia and silica components to form the desired magnesium silicate is largely affected by the solids concentration. Also the removal of surplus water greatly reduces the volume of the mass and requires fewer tanks for the hot aging step which follows.

In the hot aging step a temperature of 125° to 180° F. is employed combined with a hot aging period of 1 to 3 hours. Prior to the start of the hot aging period a predetermined amount of activation acid is added to the silica-magnesia mass. The preferred activation acid is sulphuric and the amount largely depends on the relative amounts of silica gel and magnesia which are regulated to give approximately 17 to 40% MgO in the final catalyst.

The preferred amount of activation acid represents about 1 mole of sulphuric acid to 8 moles of added magnesia; however, lesser or greater amounts may be used. In general, the greater the amount of activation acid, the greater the speed of reaction between the silica and magnesia.

Following the hot aging step, a quantity of a solution containing fluoride ion in a concentration sufficient to impregnate the silica-magnesia catalyst with from about 0.5 to 5 weight percent residual fluoride is added. We selected HF solution for the preferred mode of operation, but this is merely suggestive and by no means limited. Any soluble fluoride that preferentially forms insoluble solids with magnesium ions so as to be retained in the mass subsequent to washing may be used.

The use of soluble fluoride permits maximum dispersion of the fluoride ion within the catalyst mass. $H_2SiF_6$, $(NH_4)_2SiF_6$, $SiF_6$, $NH_4F$, $NH_4HF_2$ are suitable for this purpose. When HF is used, it may be contained in sufficient water of dilution to control fuming. Experience has shown that attempts to add a fluoride before the removal of some of the free alkali metal ions results in the formation of difficulty soluble fluoride within the catalytic mass.

The incorporation of fluoride in the catalyst stabilizes the structure for cracking operation at high temperature. In alternate procedure B, the filtration step is carried out subsequent to the hot aging rather than prior to hot aging the silica-magnesia mass as described in procedure A. As discussed in Example III, procedure B permits addition of the activation acid to the magnesia prior to mixing the magnesia with the silica gel. In practice, this was found to more than off-set the disadvantage of hot aging the more dilute mass.

In both procedures the soluble fluoride was added subsequent to the hot aging since it was found that the rate of reaction between the silica and magnesia was retarded when the soluble fluoride was added prior to the activation or hot aging step.

In both procedures following the addition of the HF solution, the silica-magnesia-fluoride mass is spray dried in a conventional manner.

In a majority of cases, it is desirable to hot age the spray dried product prior to washing. This is very convenient since the spray dried product is wet collected while still at a temperature of about 160° F. The unwashed spray dried product is hot aged at temperatures ranging from 160° F. to 180° F. for periods of 2 to 24 hours. The great advantage gained in the quality of the final product in this step is that the attrition and surface area and free MgO can be greatly reduced without loss in product pore volume. When these properties are improved by hot aging prior to spray drying, the gains are always off-set by an undesirable loss in product pore volume.

The spray dried product is washed to remove $Na_2O$ and sulfate ions. Under controlled conditions ammonium sulfate may be suitable for this purpose, but care should be taken to avoid removal of magnesium ions. This is usually the result of too low a pH or too high a temperature or concentration of ammonium sulfate solution. The catalytic mass is redried and may be activated as necessary to yield the ultimate catalyst.

Variations in conditions of drying and activation have some effect on the attrition stability of the catalyst. Experience has shown that the spray drying conditions affect the properties of the final catalyst as much as the final drying conditions.

Our invention is further illustrated by the following specific but non-limiting examples.

Example I

This example describes the operating conditions used in alternate method A. A silica gel was prepared which readily combined with the magnesia component, either before or after the spray drying step. This gel was prepared using a relatively low concentration of silica in the gel combined with a low gelation temperature and short aging time for the gel.

Because of the high rate of reaction between the silica and magnesia components in the slurry stage, relatively mild activation conditions were required prior to spray drying. In this example, longer aging of the silica magnesia slurry would have decreased the pore volume of the final product below the desired minimum of 0.70 cc./g. This effect is demonstrated in the results set out in Table II.

After the pore volume conditions are fixed in the slurry stage, the surface area, activity and other desired properties are attained in the hot aging of the spray dried product in the presence of water. It is apparent, from an inspection of the data in Table I, that the properties of the final product after aging, the unwashed, spray dried product for 1½ hours at 165° F. changes the properties of the product.

In this run, the silica gel slurry was prepared in commercial equipment by passing dilute sodium silicate solution containing 16.38 grams per liter of $Na_2O$ and 54.1 grams per liter of $SiO_2$ through a reaction coil. Carbon dioxide gas was passed into the coil at a rate such that gelation of the stream leaving the coil occurred in fifteen seconds at a temperature of 110° F. The gelation mixture was discharged at the top of a receiving tank of about 5000 gallons capacity. After 4000 gallons of silica gel was added to the tank, the silica gel was removed from the bottom of the tank at the same rate at which the gelation mixture was entering the top of the tank. The sodium silicae-carbon dioxide mixture was pumped into the tank at the rate of 200 gallons per minute and was pumped out of the tank at the same rate.

A 25 gallon quantity of the silica gel prepared, as described above, was withdrawn from the tank. This gel was aged for six minutes at 110° F. and 5,325 ml. of 39% sulfuric acid was added. This acid addition decreased the pH of the mass to 2.85 and evolved the $CO_2$ contained in the silica gel. The $CO_2$ was recovered and recycled for later gelation. The silica gel which also contained silica sol was heated to a temperature of 120° F. by passing live steam into the slurry. This diluted the batch by adding a volume of 1⅓ gallons of water. The mixture was aged at 120° F. for one hour.

A total of 2750 grams (2640 grams dry basis) of calcined magnesia was added to 4 liters of water at 130° F. The reaction mass was brought to a boil and an additional 2 liters of water were added. This prepared a hydrated magnesia, which was added to the gelled silicate. After addition of the hydrated magnesia, the pH of the slurry was 8.6. The slurry was mixed for 15 minutes and then filtered. A total of 158.5 pounds of wet filter cake was reslurried with water and 1340 ml. of 39% sulfuric acid was added. The temperature was increased to 160° F. by passing live steam into the mass. The use of the live steam diluted the overall volume of the mixture by 10 to 11 percent. The mixture was aged for 1½ hours and cooled to about 100° F. When the mass had cooled, 530 grams of 48% hydrofluoric acid solution was added. This solution was mixed thoroughly with the mass and the mass was spray dried. The spray dried product was washed, using five washes of 2° Baumé ammonium sulphate solution, heated to 115° F. and adjusted to a pH of 8.0. A 5 to 1 weight ratio of wash liquor to spray dried product was used in this washing step. The ammonium sulphate washes were followed by 3 rinses with distilled water, adjusted to a pH of 8.0 and heated to a temperature of 115° F. A 5 to 1 weight ratio of wash water to spray dried product was used. The washed product was then rapidly dried in an oven, heated to a temperature of 400° F.

The effect of aging times was evaluated in this series of runs. In one run, the silica-magnesia slurry was hot aged 2 hours at 160° F. prior to spray drying and 1½ hours at 165° F. after spray drying. In other runs, the silica-magnesia slurry was hot aged 1½ hours at 160° F. prior to spray drying and 1, 2 and 4 hours at 165° F. after spray drying. The hot aged products were washed and finally dried. The data collected in this series of runs is set out in the table below.

TABLE I

| | | | | |
|---|---|---|---|---|
| Aging time at 160° F. prior to spray drying (hrs.) | 2 | 1½ | 1½ | 1½ |
| Spray dried product aging time at 165° F. (hrs.) | 1½ | 1 | 2 | 4 |
| Analysis in weight percent, dry basis: | | | | |
| MgO | 25.4 | 25.0 | 26.2 | 28.9 |
| Na₂O | 0.027 | 0.027 | 0.030 | 0.035 |
| Fe | 0.076 | 0.070 | 0.072 | 0.077 |
| SO₄ | 0.05 | 0.29 | 0.30 | 0.17 |
| F | 3.0 | 3.3 | 3.4 | 3.6 |
| Total volatiles after heating 3 hours at 1,750° F. (in percent) | 8.0 | 8.7 | 8.6 | 8.6 |

The surface area was determined using the technique described by S. Brunauer, P. Emmett and E. Teller, J. Am. Chem. Soc. 60 309 (1938).

The pore volume was determined by the well known method described by Innes (Oil and Gas Journal Nov. 12, 1956) as follows:

Weight 10 grams of pretreated sample into a 4 oz. screw top bottle. Add distilled water from a 50 ml. burette using about 2 ml. less than amount expected to saturate the sample. Mix thoroughly with a metal spatula. Rap the bottom of the bottle against the palm of the hand. Invert the bottle after each rapping. Water is added in 0.1 ml. increments until the entire mass sticks to the bottom of the bottle when it is inverted after the mixing, shaking and rapping procedure.

$$\text{Pore Volume} = \frac{\text{ml. H}_2\text{O}}{10}$$

The attrition resistance of each of the above product was determined after activation by a standard test known as the CAE roller test, in which a sample catalyst is attrited by a blast of air for a specific length of time under narrowly defined conditions. The size analysis of the catalyst is made before and after attrition to determine the increase of the fractions of the catalysts having a particle size between 0 and 20 microns. The attrition index is expressed as the percentage increase in 0 to 0.020 micron material is determined by the following formula.

Attrition Index =
$$\frac{\text{Percent 0-20 after attrition} - \text{Percent 0-20 before attrition}}{\text{Percent}+20 \text{ material originally present}}$$

This data is set out in table II below:

TABLE II

| | | | | |
|---|---|---|---|---|
| Aging time prior to spray drying (hrs.) | 2 | 1½ | 1½ | 1½ |
| Spray dried product aging time at 165° F. (hrs.) | 1½ | 1 | 2 | 4 |
| Surface area in square meters per gram and pore volume in grams per cubic centimeter: | | | | |
| Surface area (m.²/g.) | 523 | 482 | 495 | 672 |
| Pore volume (g./cc.) | 0.68 | 0.77 | 0.75 | 0.74 |
| Attrition Index | 24.3 | 32.1 | 32.1 | 27.7 |

The activity of these catalysts were measured using the Indiana Relative Activity (IRA) test after the catalyst had been activated by steaming for 16 hours at a temperature of 1200° F. The experimental procedure followed in this test is briefly as follows:

A standard Mid-Continent virgin gas oil (214 ml.) is passed downflow through a weighed sample (80 ml. bulk volume) of catalyst during a 60 minute reaction period at 930° F. The liquid product is recovered and distilled to determine the extent of conversion. The yields of carbon and gas are determined. The Indiana Relative Activity (IRA) is defined as the number of grams of a reference catalyst required to achieve the same degree of cracking as 100 grams of test catalyst under otherwise identical operating conditions. This involves a concept of activity units which are proportional to the weight of the catalyst. For example, 200 grams of a 50 activity catalyst will accomplish the same degree of cracking as 100 grams of 100 activity catalyst. The IRA activity data is set out in Table III below.

TABLE III

| | | | |
|---|---|---|---|
| Aging time at 160° F. prior to spray drying (hrs.) | 1½ | 1½ | 1½ |
| Spray dried product aging time at 165° F. (hrs.) | 1 | 2 | 4 |
| IRA activity | 38.2 | 47.1 | 88.4 |

It is apparent from a review of these data that increasing the aging time after spray drying results in improvements in the product. The following specific improvements were noted.

(1) The MgO content increased from 25 to 28.9 percent.
(2) The fluoride content increased from 3.3 to 3.6 percent.
(3) The sulfate content decreased from 0.19 to 0.17 percent.
(4) The surface area increased from 482 to 672 square meters per gram, without much loss in pore volume.
(5) The IRA activity increased from 38.2 to 88.4.
(6) The attrition index dropped from 32.1 to 27.7.

Example II

This example describes commercial scale production using alternate method A and the equipment shown diagrammatically in the figures. Sodium silicate solution was diluted to a solution containing 16.4 grams per liter of Na₂O and 54.1 grams per liter SiO₂. The solution was heated to a temperature of 115° F. and was pumped at a rate of 148.1 gallons per minute through a retention coil comprising 160 ft. of 6″ I.D. pipe. Carbon dioxide gas was passed into the coil at a rate such that gelation of the sodium silicate occurred in 15 seconds at a temperature of 115° F. The mixture of gelled silicate in the retention coil was discharged into a 5,000 gallon capacity tank designated F-1-B in the drawings. The silica gel was pumped continuously through tanks F-1-B and F-1-A and F-1. A total volume of 4750 gallons of silica gel was held in tanks F-1-B and F-1. The volume of slurry in tank F-1-A was regulated so that the silica gel was aged an average of 65 minutes at 115° F.

The silica gel was pumped continuously from tank F-1-A and was contacted with 25% sulfuric acid in a line mixting device and discharged into closed tank designated F-3-B in the drawings, over a period of 84 minutes a total of 11,800 gallons of silica gel was pumped. A total of 2,645 pounds of sulfuric acid (as 100% H₂SO₄) was added. This addition reduced the pH of the slurry to 3.0. The CO₂ that had been added in the gelatin step was evolved by the addition of the sulfuric acid and recycled for further use in the gelation of the sodium silicate.

Hydrated calcined magnesia (MgO slurry) was prepared to contain 24.43% MgO. This slurry was mixed with the acidified silica gel that had been pumped from tank F-3-B at a rate such that 2,840 pounds of MgO was added as slurry over a period of 80 minutes. The silica-magnesia slurry was pumped through a surge tank designated as F-4-B and then passed to the rotary filter where the filter cake was recovered and discharged into a tank designated as F-55 in the drawing. When the desired amount of cake had been accumulated in tank F-55, filtration was stopped and a total of 184 pounds of sulfuric acid (as H₂SO₄) was added as a 25% solution. The amount of silica-magnesia slurry contained in tank F-55 was such that the acid added was equivalent to 8.8% of the MgO present and the $H_2SO_4/SiO_2$ ratio was 0.99. The filter cake slurry was then transferred to the tank designated F-5B in the drawing and heated from 120° F. to 158° F. over a period of 40 minutes using a steam coil. The batch was hot aged at 158° F. for a period of 95 minutes at which time 145 pounds of 70% hydrofluoric acid solution was added. This resulted in a slurry having a pH of 7.6. The slurry was then spray dried in a commercial spray drier, operated at an inlet temperature of 890° F. and an outlet temperature of 385° F. The spray dried product was wet collected with water and discharged from the cone of the spray drier using sufficient water to give a slurry containing 50% solids, (by centrifuge determination).

The wet collected spray dried product was pumped to the hot aging tank F-35-B, designated in the drawings, where it was hot aged for 4 hours at 180° F. At the end of the hot aging, the spray dried product was washed on horizontal filters. The pH of the hot aged slurry supplied to the filters was 7.2.

The spray dried product was rinsed first with water at 130° F., then with 1.6° Baume ammonium sulfate solution, heated to a temperature of 115° F. and adjusted to a pH of 8.5. The product was finally rinsed with deionized water at a temperature of 140° F. The washed catalyst was then dried in a conventional drier.

The data collected in this run is set out in Tables IV and V:

TABLE IV.—FINISHED PRODUCT ANALYSIS

Chemical analysis in percent (dry basis):

| | |
|---|---|
| $Al_2O_3$ | 0.37 |
| $Na_2O$ | 0.056 |
| Fe | 0.052 |
| $SO_4$ | 0.02 |
| MgO | 27.95 |
| F | 3.52 |
| $MgO-H_2SO_4$ (titratable) | 9.5 |
| T.V. at 1750° F. | 8.52 |

Physical analysis:

Screen:

| | |
|---|---|
| +100 | 0.5 |
| +140 | 2.5 |
| +200 | 15.4 |

CAE, microns:

| | |
|---|---|
| 0–20 | 1.6 |
| 20–40 | 9.2 |
| 40–80 | 59.3 |
| 80+ | 29.9 |
| APS | 62 |
| Density lbs./ft.$^3$ | 33.2 |
| Surface area m.$^2$/g. | 653 |
| Pore volume cc./g. | 0.83 |
| Attrition | 17.5 |

TABLE V.—ACTIVITY, PHYSICAL AND CHEMICAL DATA

Treatment:

IRA activity after steaming 16 hrs. at 1200° F. _____ 95.7

After steam streatment 25 hrs. at 1250° F.:

| | |
|---|---|
| $D+L$ | 54.1 |
| GPF | 0.79 |
| CPF | 0.78 |
| Percent fluoride | 3.72 |
| Surface area (m.$^2$/g.) | 699 |
| Pore volume (cc./g.) | 0.78 |

Calcination 3 hours at 1550° F.:

| | |
|---|---|
| $D+L$ | 47.8 |
| GPF | 0.76 |
| CPF | 0.68 |
| Percent fluoride | 3.27 |
| Surface area (m.$^2$/g.) | 371 |
| Pore volume (cc./g.) | 0.64 |

Calcination 3 hours at 1650° F.:

| | |
|---|---|
| $D+L$ | 25.4 |
| GPF | 0.94 |
| CPF | 1.21 |
| Surface area (m.$^2$/g.) | 218 |
| Pore volume (cc./g.) | 0.59 |

Calcination 3 hours at 1700° F.:

| | |
|---|---|
| $D+L$ | 21.4 |
| GPF | 1.54 |
| CPF | 0.78 |
| Percent fluoride | 1.89 |
| Surface area (m.$^2$/g.) | 76 |
| Pore volume (cc./g.) | 0.54 |

After steam, 24 hours at 1050° F.:

| | |
|---|---|
| $D+L$ | 44.0 |
| GPF | 0.95 |
| CPF | 0.97 |

3 hours at 1750° F.:

| | |
|---|---|
| Percent fluoride | 1.51 |
| Surface area (m.$^2$/g.) | 64 |
| Pore volume (cc./g.) | 0.45 |

These data show the high cracking activity of the catalyst as well as thermal stability of the catalyst. For example, after treatment with steam for 16 hours at 1200° F., the IRA cracking activity was 95.7. After steaming for 24 hours at 1050° F., the $D+L$ activity was 44.0. The thermal stability is demonstrated by the surface area, pore volume and cracking activities after heating at 1550° F., 1650° F. and 1700° F. It is well known that silicamagnesia cracking catalyst in the absence of fluoride suffers a collapse in structure when subjected to temperatures above 1450° F. The data clearly show that the cracking activity of our product was not appreciably damaged by treatment at temperatures as high as 1700° F. This is borne out most significantly in the retention of the pore volume of 0.54 cc./g. after calcination at temperature of 1700° F.

Example III

This example illustrates the modification B. In Examples I and II the product was filtered after addition of the magnesia to the silica gel. This was done to increase the solids content of the silica-magnesia slurry, thus accelerating the speed of activation and reducing the number of hot aging tanks required for activating the silicamagnesia slurry. In this example, the filtration was carried out subsequent to hot aging the silica-magnesia slurry. This necessitates hot aging a larger volume of silicamagnesia slurry, but results in a processing advantage in that the rate of activation is increased by retention of the magnesium sulfate formed when the hydrated magnesia is added to the silica sol adjusted to a pH of 2.7–2.9. The activation process is further accelerated by adding the activation acid to the hydrated magnesia rather than to the silica-magnesia slurry or to the silica gel.

The major advantages gained in this procedure is to reduce the loss of magnesia and reduce the water load during the spray drying step. The effect on the final product of adding the activation acid to the hydrated magnesia is shown in Table VI. The surface area of the product where the activation acid was added to the hydrated magnesia was 631 m.$^2$/g. as compared to 586 m.$^2$/g. where the acid was added to the silica gel. The product with a surface area of 631 m.$^2$/g. had a very high (92.2) IRA cracking activity after steaming for 16 hours at 1200° F.

In this example, silica gel slurry was prepared in commercial equipment by pumping the dilute heated sodium silicate containing 16.8 grams per liter $Na_2O$ and 55.6 grams per liter $SiO_2$ through a reaction coil at a rate of 200 gallons per minute. Carbon dioxide was also passed into the reaction coil at a rate such that 78% of the $Na_2O$ contained in the silicate was neutralized. The streams leaving the reactor gelled in 15 seconds at a temperature of 110° F. The gelled mixture was discharged at the top of a 5000 gallon capacity tank. A total of 4000 gallons of gel was accumulated in the tank and this slurry was pumped out of the bottom of the tank at the same rate the gelation mixture was discharged at the top of the tank.

A total of 34 gallons of the silica gel prepared as described above was withdrawn from the pump-out of the gelation tank. The silica gel was aged in pilot plant equipment for 20 minutes and a total of 6680 ml. of 39% sulfuric acid was added. This acid addition adjusted the slurry pH to 2.7. The temperature was increased to 127° F., then 912 ml. of 39% sulfuric acid was added to adjust the pH to 1.8 and 14 pounds of previously hydrated calcined magnesia slurry which contained 28% MgO was added. The slurry temperature was increased to 160° F. in 20 minutes and the slurry hot aged for 2 hours at 160° F. The live steam used to increase the temperature increased the volume of the slurry by 10%. At the end of the 2 hour aging period, 360 grams of 48% hydrofluoric acid was added.

The product was then filtered and 90.5 pounds of the filter cake was reslurried with 4 liters of water and spray dried.

Part B was processed in the same manner as Part A except that 912 ml. of 39% sulfuric acid was added to 14 pounds of calcined hydrated magnesia prior to mixing the magnesia with the silica gel. The slurry was hot aged for 2 hours at 160° F. At the end of the 2 hour period, 360 grams of 48% hydrofluoric acid was added. The product was then filtered and 90.5 pounds of the filter cake were reslurried with water and spray dried.

The unwashed spray dried products were reslurried with water using 50–50 water to spray dried product concentration. The spray dried products were hot aged for 4 hours at 180° F. using slow agitation. The hot aged product was filtered, and washed with 2° Baume ammonium sulfate solution, adjusted to a pH of 8.0 and heated to 135° F. followed by 3 rinses with ammoniated distilled water. A 5:1 ratio of wash liquor to spray dried product was used in these washes. The washed product was then filtered and flash dried.

The physical and chemical analysis of the product is set out in Table VI below:

TABLE VI

| Product | A | B |
|---|---|---|
| Activation acid added to | Silica gel | Hydrated magnesia |
| Chemical analysis in weight percent, dry basis: | | |
| MgO | 28.9 | 30.96 |
| Na₂O | 0.035 | 0.016 |
| SO₄ | 0.17 | 0.16 |
| F | 3.6 | 3.27 |
| Physical properties after calcination 3 hours at 1,250° F.: | | |
| Surface area in square meters per gram | 672 | 631 |
| Pore volume in cc./g | 0.74 | 0.76 |
| Attrition index | 27.7 | 29.1 |
| Cracking activity by IRA test after steam treatment 16 hours at 1,200° F | 88.4 | 92.2 |

These data show that a satisfactory product can be recovered when the activation acid is added to either the silica gel or hydrated magnesia.

Example IV

This example illustrates the effect of the content of magnesia on the cracking activity of the catalyst. The magnesia content of these catalysts was varied from 17.2 to 36%. In this run, the catalyst containing 17.2% magnesia was prepared using the procedure shown in Example III, except that 7.5 pounds of magnesium hydroxide slurry (28% MgO) was added to 17 gallons of the silica gel adjusted to a pH of 2.7. A total of 600 ml. of 39% sulfuric acid was added to the magnesium hydroxide slurry prior to addition of the magnesium hydroxide to the silica gel. The silica-magnesia slurry was hot aged for 2 hours at 160° F., after which 310 grams of hydrofluoric acid solution was added. The addition of this acid resulted in a slurry with a pH of 7.2. The slurry was filtered and the filter cake was reslurried with water and spray dried. The unwashed spray dried product was hot aged for 4 hours at 180° F. and then washed as described in the other examples and finally flash dried.

The preparation procedure for the catalyst containing 22% magnesia was the same as for the catalyst containing 17.2% magnesia, except that the magnesium hydroxide slurry added to the silica gel was increased from 7.5 pounds to 9.5 pounds and 760 ml. of 39% sulfuric acid was added. The amount of hydrofluoric acid solution added was increased from 310 grams to 320 grams.

The preparation procedure for the product that contained 36% MgO was the same as for the product containing 22% MgO, except that the amount of magnesium hydroxide slurry added to the silica gel was increased to 19.3 pounds. A total of 1292 ml. of 39% sulfuric acid was added to the system prior to the addition of the magnesium hydroxide to the silica gel. The amount of 48% hydrofluoric acid solution added was increased to 396 grams.

The data collected in this series of runs is set out in Table VII below:

TABLE VII

| Catalyst | A | B | C |
|---|---|---|---|
| Chemical analysis in percent dry basis: | | | |
| MgO | 17.2 | 22.0 | 36.0 |
| Na₂O | 0.018 | 0.018 | 0.016 |
| SO₄ | 0.09 | 0.03 | 0.15 |
| Fluoride | 2.9 | 3.04 | 3.32 |
| Physical properties after calcination 3 hours at 1,250° F.: | | | |
| Surface area in square meters/g | 526 | 597 | 595 |
| Pore volume in cc./g | 0.90 | 0.77 | 0.67 |
| Attrition index | 17 | 19 | 29 |
| Cracking activity by I.R.A. test after treatment with steam at 1,200° F. for 16 hours | 33.8 | 67.0 | 100 |
| After above treatment of a product wet aged at 180° F. for an additional 4 hours: | | | |
| Surface area in square meters per gram | | | 666 |
| Pore volume in cc./g | | | 0.65 |
| I.R.A. activity | | | 118.2 |

FIGURE III is a graphical representation of the relationship between cracking activity and the MgO content of the catalyst. This relationship holds only when all the products have been prepared using similar processing procedures. This includes the control of the variables relating to the silica component, as well as the magnesia component. It also includes the variables relating to the manner in which the silica-magnesia components are reacted to form the catalytic magnesium silicate. The manner in which the fluoride component is incorporated into the catalyst affects the reaction between the silica and magnesia and therefore the cracking activity of the final product.

The variables which relate to the silica component include: the silica concentration in the silica gel, the $CO_2$ gelation condition, the pH, aging time and temperature before sulfuric acid addition to the gelled silicate.

The variables relating to the magnesia component include the type of magnesia used such as calcined magnesia, hydrates magnesia, magnesium hydroxide slurry derived from dolomite, magnesium hydroxide slurry precipitated from magnesia salts, magnesia oxysalts (prepared by reacting calcined magnesia with magnesium sulfate or sulfuric acid), etc. Dead burned calcined magnesia is considered undesirable for use in our process. In the use of a calcined magnesia, the degree of calcination of the magnesia is important as is generally indicated by surface area and iodine number.

The variables relating to the reaction between the silica and magnesia components include, for example
(1) Aging time and temperature of the silica-magnesia slurry prior to spray drying,
(2) Aging time and temperature of the silica-magnesia spray dried product,
(3) Concentration of solids during aging of the silica-magnesia slurry or in the spray dried product, (4) The amount of activation acid or soluble magnesium salt employed during aging of the silica-magnesia component.

Another important variable is the manner of introduction of the fluoride component; addition of hydrofluoric acid to the silica magnesia slurry has been found to retard the reaction, probably because of the formation of insoluble magnesium fluoride or silicon magnesium fluoride.

The manner in which the relationship between MgO content of the product and cracking activity may be altered by an alteration of the processing steps is demonstrated in Table VII C. The cracking activity of the product containing 36% MgO was increased from 100 to 118 by further hot aging of the washed and dried product.

Example V

This example illustrates a method of producing the high surface area product having excellent attrition properties. The process covered in this example permits a sizable temperature reduction in the hot aging of the voluminous silica-magnesia slurry by use of a hot aging stage, after spray drying and by using a low silica concentration in the gel.

Dilute sodium silicate solution containing 12.7 grams per liter of $Na_2O$ and 42 grams per liter of $SiO_2$ was pumped at a rate of 1.1 gallon per minute through a reaction coil into which $CO_2$ was also being passed at a rate such that gelation of the silicate leaving the coil occurred in 13 seconds at a temperature of 84° F. After 34 gallons of silica gel had been produced, the flow was diverted from the receiving vessel. The silica gel was aged 30 minutes at 84° F. The pH of the gel was 8.8. At the end of the 30 minute period, 5000 ml. of 39% sulfuric acid was added. This addition decreased the pH to 2.8. The slurry was aged an additional 20 minutes and 20.7 pounds of hydrated calcined magnesia (28% MgO) to which 1620 ml. of 29% sulfuric acid had been previously added and the temperature increased by heating the vessel with live steam. The temperature was increased to 125° F. in this manner. Use of live steam to heat the slurry increased the volume by 10%. The composite was aged for 2 hours at 125° F., then cooled to 100° F. and 560 grams of 48% hydrofluoric acid solution was added. The slurry was then filtered and spray dried. The spray dried product was wet collected and hot aged for 4 hours at 180° F., using the equipment described in Example II. The hot aged spray dried product was then washed and dried as in the other examples. The data collected in this run is set out in Table IX.

TABLE XI

Chemical analysis in percent dry basis:
| | |
|---|---|
| MgO | 27.13 |
| $Na_2O$ | 0.020 |
| $SO_4$ | 0.10 |
| Fluoride | 3.01 |

Physical properties after 3 hours at 1250° F.:
| | |
|---|---|
| Surface area in square meters per gram | 643 |
| Pore volume in cc./g. | 0.56 |
| Attrition index | 16.2 |

What is claimed is:

1. A process for preparing a silica-magnesia-flouride cracking catalyst which comprises:
   (a) diluting a sodium silicate solution to a $SiO_2$ content of 4.0% to 10.0% in the gel,
   (b) gelling the silicate by the addition of gaseous carbon dioxide until the $Na_2O$ content of the silicate is neutralized,
   (c) adjusting the pH of the gel to about 2.0 to 5.0 with a strong mineral acid,
   (d) aging at a temperature of up to 150° F. to expel the residual $CO_2$,
   (e) adding a quantity of magnesia sufficient to provide a magnesia content in the final product of about 17 to 40% in the final product,
   (f) filtering the composite,
   (g) reslurrying the filter cake, adding an additional quantity of a strong mineral acid sufficient to provide 6 to 16 moles of MgO per mole of acid,
   (h) heating the mass to 125° F. to 180° F. and aging for about 1 to 3 hours, adding sufficient fluoride containing compound to provide a fluoride content of 0.5 to 5.0 percent in the final product,
   (i) spray drying, aging the spray dried product for 1 to 4 hours at about 160° F. to 180° F.,
   (j) washing and recovering the silica-magnesia fluoride product,
   (k) finally drying the washed composite and recovering the catalyst product.

2. The process according to claim 1 wherein the magnesia was added as hydrated calcined magnesia.

3. The process according to claim 1 wherein the magnesia is added as precipitated $Mg(OH)_2$ slurry.

4. The process according to claim 1 wherein the fluoride containing compound is selected from the group consisting of HF, $H_2SiF_6$ $(NH_4)_2SiF_6$, $SiF_6$, $NH_4$, F and $NH_4HF_2$.

5. The process according to claim 1 wherein the strong mineral acid is sulfuric acid.

6. A process for preparing a silica-magnesia fluoride cracking catalyst which comprises:
   (a) diluting a sodium silicate solution to an $SiO_2$ content of 4% to 10% in the gel,
   (b) gelling the silicate by the addition of gaseous carbon dioxide until the $Na_2O$ content of the silicate is neutralized,
   (c) adjusting the pH of the gel to about 2.0 to 5.0 with strong mineral acid,
   (d) aging at a temperatue of up to 150° F. to expel residual carbon dioxide,
   (e) adding a quantity of magnesia sufficient to provide a magnesia content of about 17% to 40% in the final product,
   (f) filtering the composite,
   (g) reslurrying the filter cake, heating the mass to 125° F. to 180° F. and aging for about 1 to 3 hours,
   (h) adding sufficient fluoride containing compound to provide a fluoride content of 0.5 to 5 percent in the final product,
   (i) spray drying, aging the spray dried product for 1 to 4 hours at 160° F. to 180° F.,
   (j) washing and recovering the silica-magnesia fluoride product,
   (k) finally drying the washed composite and recovering the catalyst product.

7. A process for preparing silica-magnesia-fluoride cracking catalyst which comprises:
   (a) diluting a sodium silicate solution to a $SiO_2$ content of 4.0 to 10 percent in the gel,
   (b) gelling the silicate by adding gaseous carbon dioxide until about 50 to 100 percent of the $Na_2O$ content of the silicate is neutralized,
   (c) adjusting the pH of the gel to about 2.0 to 5.0 with sulfuric acid,
   (d) aging at a temperature of up to 150° F. to expel the residual $CO_2$,
   (e) preparing a magnesia slurry by adding water and a quantity of strong mineral acid to magnesia in an amount sufficient to provide 6 to 16 moles of MgO per mole of acid,
   (f) adding a quantity of said magnesia slurry sufficient to provide a magnesia content of about 17 to 40% in the final product,
   (g) heating the composite to about 125–180° and aging at this temperature for about 1 to 3 hours,
   (h) adding sufficient hydrofluoric acid to provide about 0.5 to 5 percent fluoride in the final product,
   (i) filtering the composite,
   (j) reslurrying the filter cake with water and spray drying, (k) reslurrying the spray dried product with water, heating to about 160° F. to 180° F. and aging for about 1 to 4 hours, (l) filtering, washing, finally drying the washed composite, and recovering the product catalyst.

8. The process according to claim 7 wherein the aged, spray dried product is washed with 2° Baume ammonium sulfate solution followed by rinses with distilled water.

9. The process according to claim 7 wherein the magnesia source for preparing the magnesia slurry is selected from the group consisting of hydrated calcined magnesia and precipitated magnesium hydroxide.

10. A process for preparing silica-magnesia-fluoride cracking catalyst which comprises:

(a) diluting a sodium silicate solution to a $SiO_2$ content of 4.0 to 10 percent in the gel, (b) gelling the silicate by adding gaseous carbon dioxide until about 50 to 100 percent of the $Na_2O$ content of the silicate is neutralized, (c) adjusting the pH of the gel to about 2.0 to 5.0 with sulfuric acid, (d) aging at a temperature of up to 150° F. to expel the residual $CO_2$, (e) preparing a magnesia slurry by adding water to magnesia, (f) adding a quantity of said magnesia slurry sufficient to provide a magnesia content of about 17 to 40% in the final product, (g) heating the composite to about 125–180° and aging at this temperature for about 1 to 3 hours, (h) adding sufficient hydrofluoric acid to provide about 0.5 to 5 percent fluoride in the final product, (i) filtering the composite, (j) reslurrying the filter cake with water and spray drying, (k) reslurrying the spray dried product with water, heating to about 160° F. to 180° F. and aging for about 1 to 4 hours, (l) filtering, washing, finally drying the washed composite, and recovering the product catalyst.

References Cited

UNITED STATES PATENTS

| | | | |
|---|---|---|---|
| 3,129,189 | 4/1964 | Wilson et al. | 252—441 |
| 3,243,262 | 3/1966 | Carr et al. | 252—451 X |
| 3,267,044 | 8/1966 | Wilson et al. | 252—451 |

DANIEL E. WYMAN, *Primary Examiner.*

C. F. DEES, *Assistant Examiner.*